INVENTOR.
Ernest W. Upton
BY
Frederick M. Ritchie
HIS ATTORNEY

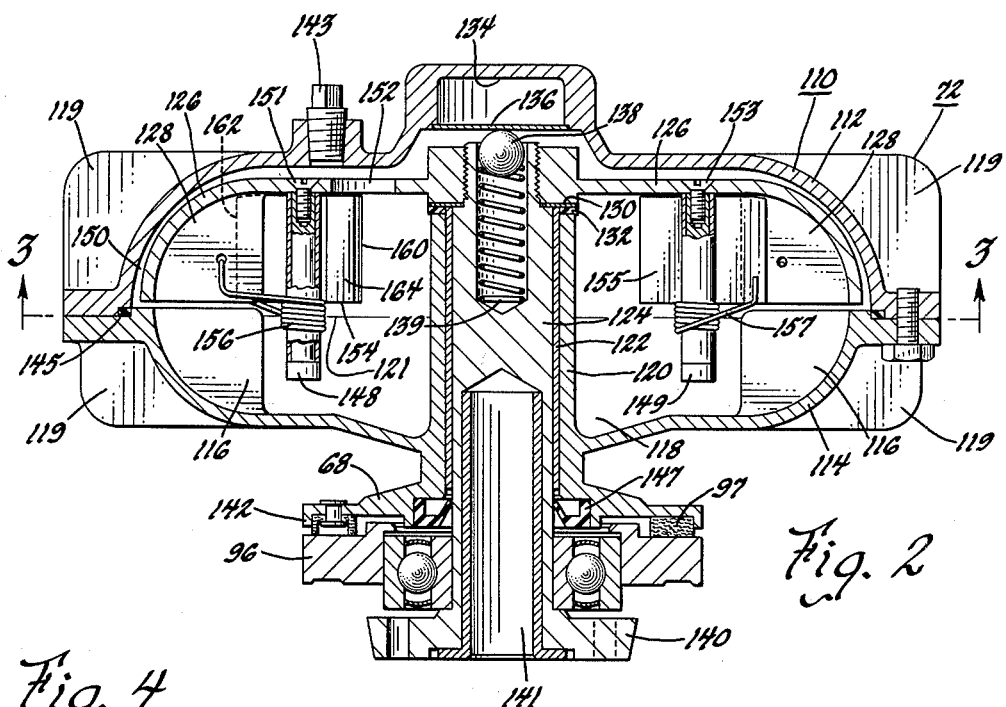
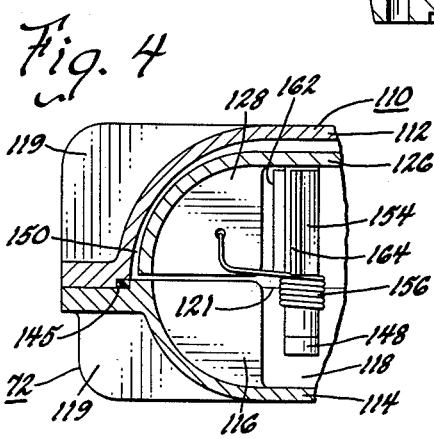
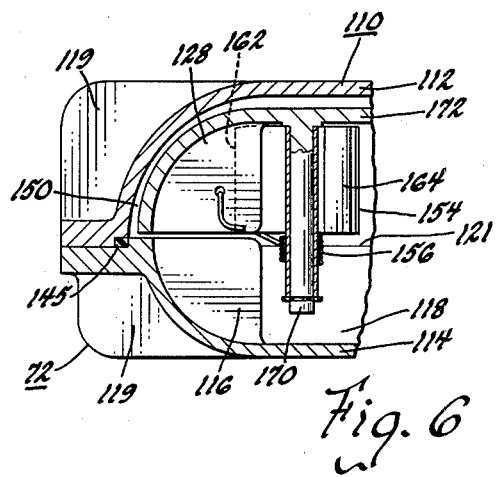
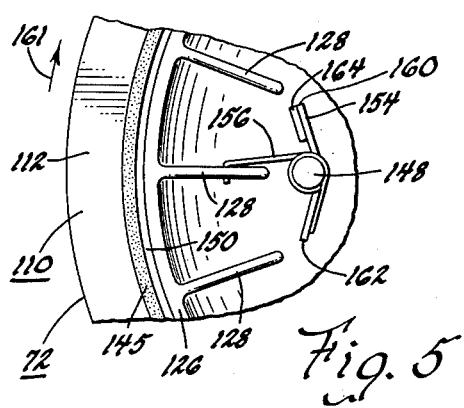

Feb. 9, 1965　　　　E. W. UPTON　　　　3,168,811
HYDRAULIC COUPLING

Filed May 21, 1962　　　　　　　　　　4 Sheets-Sheet 3

INVENTOR.
Ernest W. Upton
BY
Frederick M. Ritchie
HIS ATTORNEY

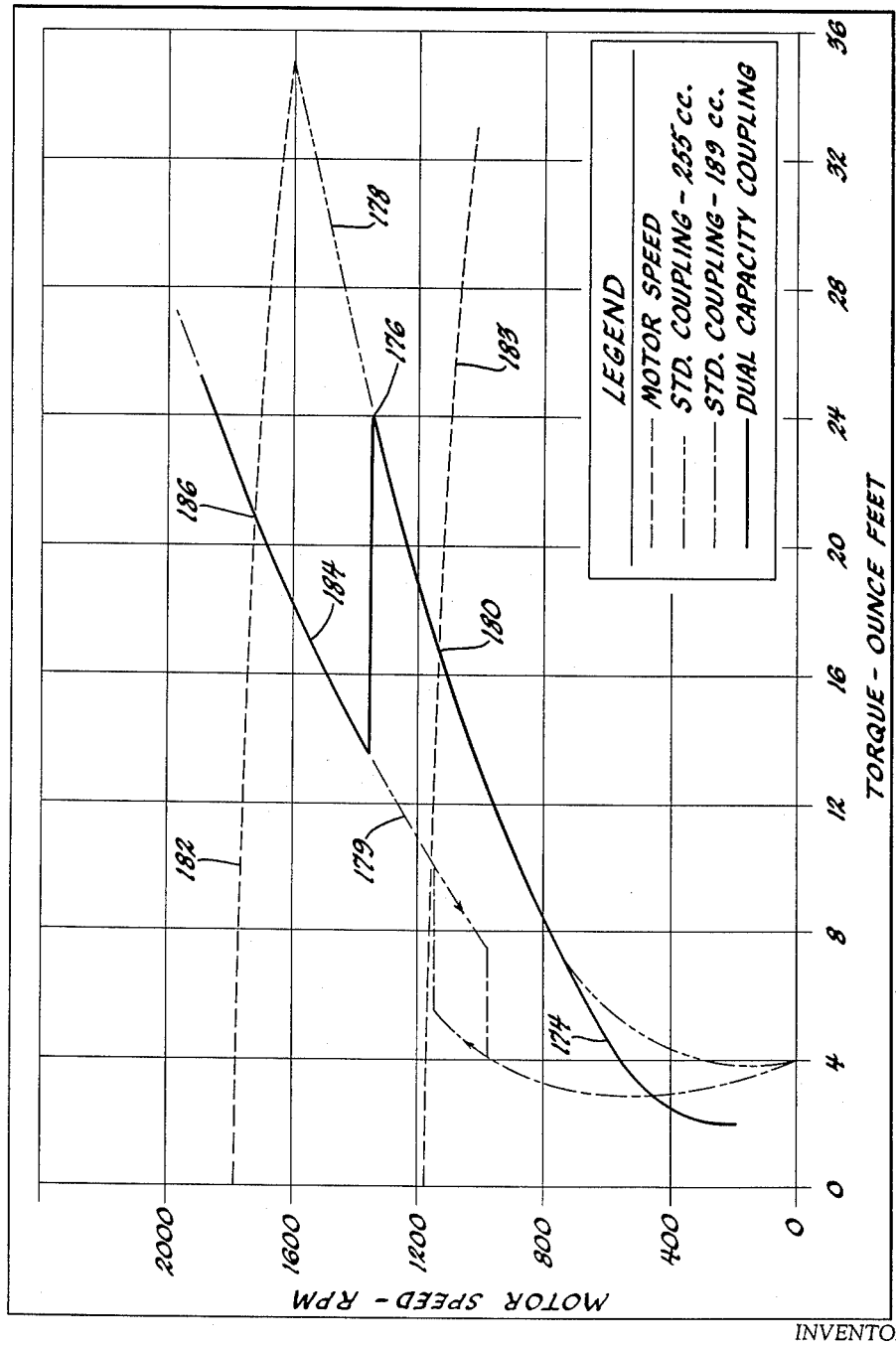

United States Patent Office 3,168,811
Patented Feb. 9, 1965

3,168,811
HYDRAULIC COUPLING
Ernest W. Upton, Birmingham, Mich., assignor to General Motors Corporation, Detroit, Mich., a corporation of Delaware
Filed May 21, 1962, Ser. No. 196,263
1 Claim. (Cl. 60—54)

This invention relates to a domestic appliance and more particularly to an improved fluid coupling for a multiple speed clothes washer.

The introduction of two-speed operation to a clothes washer having a fluid coupling between the motor and the spin tub has raised certain problems not heretofore apparent. Using such a prior art machine provided with high and low-speed spin, testing has shown that tub speed during low-speed spin is not consistent with regard to either final tub speed or time required to reach the given tub speed. This same testing has shown that the low-speed spin operation could be made more consistent by increasing the amount of oil in the fluid coupling. However, this solution would require a more powerful high-speed motor to perform satisfactorily at low line voltage. Actually, optimum tub spin results can be achieved if a given fluid coupling has one charge of oil during high-speed motor operation and another larger charge of oil during low-speed operation. This invention is directed to a fluid coupling which will accomplish these optimum results with a single charge of oil.

Accordingly, it is an object of this invention to provide a dual range fluid coupling for a multiple speed clothes washer.

More particularly, it is an object of this invention to extend radially selectively the length of two fluid coupling impeller vanes to increase the torque transmitting capacity of the fluid coupling at low speed, said extensions being pivotally mounted, counterweighted and spring loaded in such a way that they swing approximately 90° to an out-of-the-way position where their affect on the fluid is minimized at high speed.

A more general object of this invention is the provision of a vertically oriented fluid coupling connected to a multiple speed motor, wherein said coupling includes means responsive to the speed of said motor to alter the torque requirements of said fluid coupling.

Further objects and advantages of the present invention will be apparent from the following description, reference being had to the accompanying drawings wherein preferred embodiments of the present invention are clearly shown.

In the drawings:

FIGURE 2 is a sectional view of one embodiment of the fluid coupling taken along line 2—2 in FIGURE 3;

FIGURE 4 is a fragmentary side sectional view of the fluid coupling of FIGURE 2 with the pivotal vane portion of this invention in its high-speed drive position;

FIGURE 5 is a fragmentary view with parts broken away, taken in the direction of 3—3, to show the vane portion in FIGURE 4 in elevation;

FIGURE 6 is a fragmentary side sectional view of another embodiment of the fluid coupling with the pivotal vane in its low-speed drive position; and FIGURE 7 is a graphic representation at stall condition (motor speed vs. fluid coupling torque) of the dual capacity fluid coupling of this invention.

Figure 1:
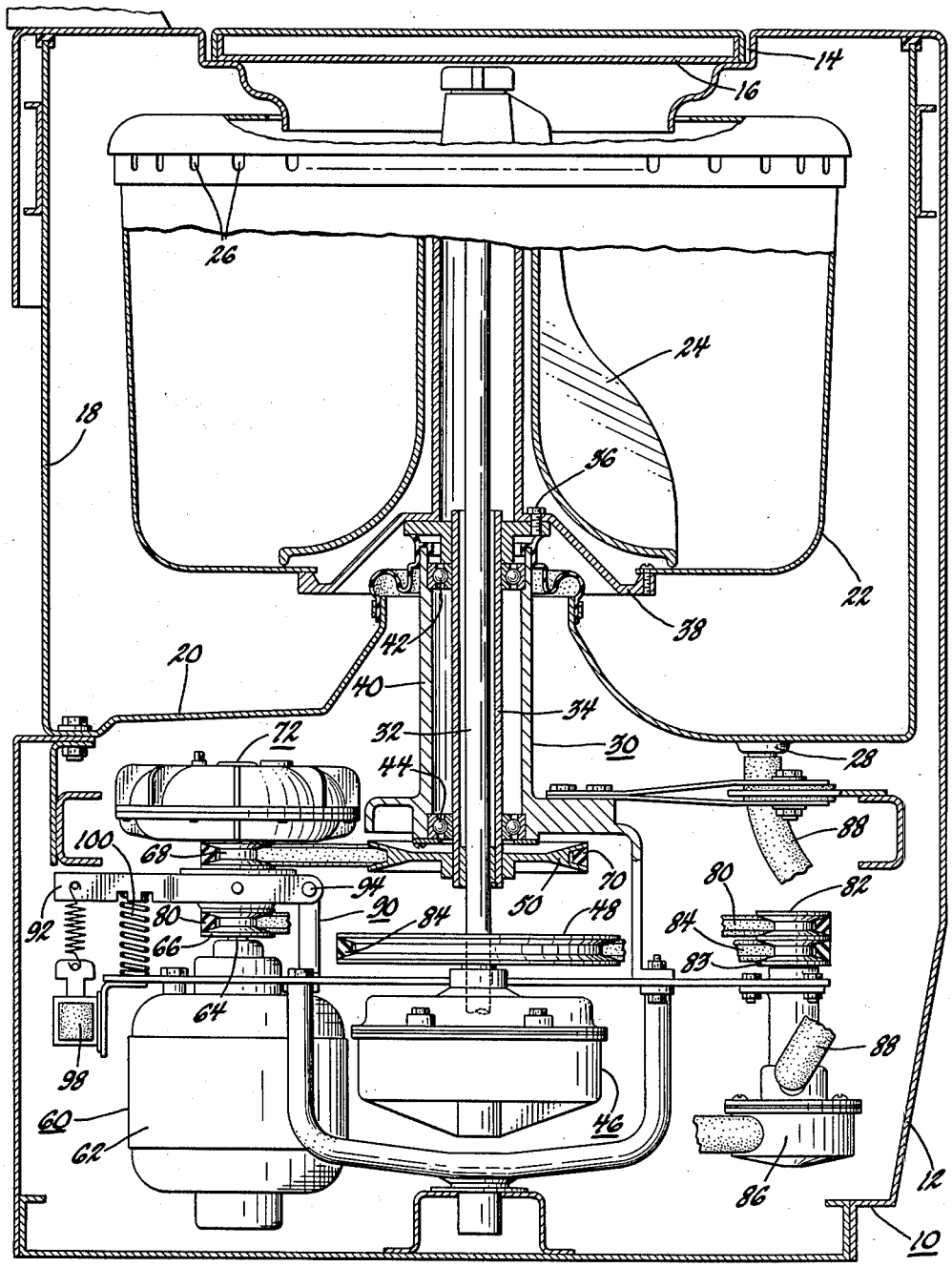
FIGURE 1 is a sectional view, partly in elevation, of a clothes washer provided with the fluid coupling of this invention.

In accordance with this invention and with reference to FIGURE 1, a domestic clothes washing machine 10 is shown. The clothes washer is defined by an outer casing 12 having a top opening 14 closable by a hingedly mounted access door 16. A water container 18 is supported within the casing 12 and includes a bottom wall 20 for separating the water container from the machinery compartment therebelow. A spin tub 22 is rotatably supported within the water container 18 and includes an agitator 24 oscillatably mounted within the tub. When the tub 22 is rotated, water contained therein is centrifuged through a plurality of outflow ports 26 about the upper periphery of the tub. Water reaching the water container 18 leaves the container by way of a drain outlet 28 in the bottom wall 20 thereof.

The oscillating and spinning mechanism is shown generally at 30 and includes an oscillator shaft 32 extending upwardly into the spin tub for connection with the agitator 24 and a spin shaft 34 extending upwardly for connection as by a fastener 36 to a tub support plate 38. An outer housing 40 encloses both the agitate and spin shafts and includes bearings 42, 44 at the extremities thereof for rotatably supporting the spin shaft 34. At the lower end of the oscillate shaft 32, a motion translating mechanism 46 is adapted to be actuated by an oscillate driven pulley 48 to pivot the oscillate shaft 32 back and forth so that the agitator 24 within the spin tub can agitate the clothes. Fastened to the spin shaft 34 is a spin driven pulley 50 which is effective to rotate the spin shaft 34 and through it the spin tub 22. In short, the agitator 24 is actuated when the pulley 48 is selectively rotated and the spin tub 22 is rotated when the pulley 50 is being driven.

The prime moving system, shown generally at 60, is positioned adjacent the oscillating and spinning mechanism 30 and is adapted to selectively rotate the spin driven pulley 50 or the oscillate driven pulley 48 at the preselected speed. For this purpose a two-speed motor 62 is mounted with its power shaft 64 carrying on a lower portion thereof an oscillating drive pulley 66.

During oscillation, the motor 62 rotates the oscillate drive pulley 66 and, through the oscillate belt 80, pump pulleys 82 and 83 and the belt 84, the oscillate driven pulley 48 which operates in turn the motion translating mechanism 46 to oscillate the shaft 32. A pump 86 may be connected to the water container 18 by way of the conduit 88 for pumping centrifuged water from the water container to a remote drain.

On the upper end of the power shaft 64 and drivably connected thereto, the prime mover system 60 includes a fluid coupling shown generally at 72, the outer casing of which is formed as the spin drive pulley 68. A belt 70 interconnects the spin drive pulley 68 and the spin driven pulley 50. In general, the power shaft 64 drives through the fluid coupling 72 to rotate the spin drive pulley 68. Since the motor 62 is two-speed, the spin driven pulley 50 can be selectively rotated at one of two speeds. This invention is directed to a fluid coupling system which provides consistent low speed operation and which includes means for reducing the torque requirements of the fluid coupling at higher speeds. This will be described more fully hereinafter in connection with the construction of the fluid coupling 72.

Referring again to FIGURE 1, a combination clutch and brake 90 has a lever 92 pivoted at 94 to actuate a brake plate or disc 96 (FIGURE 2) into a lower brake disengaged position when the solenoid 98 is energized and spring biased by the spring 100 into a raised brake engaged position when the solenoid 98 is deenergized. Friction material 97 carried by an annular brake flange 142 on the fluid coupling housing cooperates with the brake plate 96 when raised to hold the fluid coupling stationary while the agitator 24 is being operated.

The operation of the prime moving system 60 is as follows. The motor 62 may be energized for either high or low speed. During both agitation and spin, the pulley 66 rotates continuously to drive the pump 86 and the oscillate driven pulley 48. Whenever the washer is conditioned for agitation, solenoid 98 is deenergized to set the fluid coupling brake and there is a solenoid actuated dog clutch (not shown) within the motion translating mechanism 46 which engages a driving connection between the oscillate shaft 32 and the pulley 48. Whenever the system is conditioned for spin, however, the solenoid 98 is energized to release the fluid coupling brake, the driving connection between the oscillate shaft and the pulley 48 is disengaged in the motion translating mechanism 46 and the power shaft 64 drives the spin driven pulley 50 through the fluid coupling 72. Depending on whether the motor is in high or low speed, the tub 22 will be rotated respectively at high or low speed.

The prior art fluid couplings do not perform satisfactorily in combination with the two-speed drive set forth hereinabove. It appears that an optimum fluid clutch or coupling would be one having the combined performance characteristics of a coupling charged with 189 cc. of oil at high-speed motor operation and of one charged with 255 cc. of oil at low-speed motor operation—the oil charge being in an approximately six-inch diameter verticaly oriented coupling approximately two inches in depth. This invention is directed to an improved fluid coupling which embodies in a single device charged with approximately 250 cc. of oil the optimum results obtainable heretofore only with two separate fluid clutches containing oil in the relative quantities set forth immediately hereinabove.

Turning now to FIGURE 2, the fluid coupling is shown comprised of a generally circular housing or casing 110 about six inches in diameter having an upper portion 112 and a lower complementary portion 114 which form an internal cavity about two inches deep. The lower portion 114 includes a plurality of integrally formed internal driven blades or vanes 116 disposed exteriorly or radially outwardly of a reservoir portion 118 charged with approximately 250 cc. of oil 121. Fins or vanes 119 on the outside of the housing improve heat transfer from the coupling. Extending upwardly from the center of the lower portion 114 is an upstanding collar 120 carrying a sleeve bearing 122 which receives the drive shaft 124. Threadedly connected to the upper end of the drive shaft 124 is the impeller or head 126. The head 126 carries a plurality of integral drive blades 128 on the underside of a generally dished out annular impeller disc. A thrust bearing 130 and nylon washer 132 are effective to rotatably mount the head 126 on top of the collar 120. A recessed portion 134 in the top of the upper housing portion 112 carries a disc 136 on which a ball bearing 138 is biased by a spring 139.

The drive shaft 124 extends out of the casing and defines a motor connector flange 140 to which the power shaft 64 of the motor is attached—a lined cavity 141 being formed therein to receive and align the power shaft 64. Note that the lower housing portion 114 is formed in a manner to define the oscillate drive pulley 68 and the brake flange 142. Oil may be supplied to the reservoir 118 through the plug 143. Suitable seals 145 and 147 are used to prevent leakage of the oil from the fluid coupling housing.

In general, the fluid coupling operates as follows. When the drive shaft 124 is rotated, the impeller 126 starts to turn and a depending arm or stirrer 148 starts to swirl the oil in the reservoir 118. Under the swirling action, oil centrifugally climbs the outer wall of the reservoir and enters the cavity 150 between the top side of the impeller 126 and the upper housing 112.

With sufficient oil, such as 250 cc., some of the oil rises into the region of the drive blades 128 at the outer diameter. Another portion of the oil is splashed generally upward by the stirrers where it reaches the inner radii of the blade extensions 154 and 155, and is subjected to centrifugal action. This action throws it radially outward where it turns and is discharged onto the blades 116 of the driven member. It flows to lower inner end of blades 116, is discharged generally radially inward where it is again acted upon by the stirrers. Thus, a toroidal circulation of oil is set up primarily between the blades which effects a fluid connection between the impeller 126 and the bladed turbine part of casing 110, tending to lock the impeller and casing together. As slip reduces, the casing 110 starts to rotate and the pulley 68 is effective to rotate the spin driven pulley 50.

Figure 3:
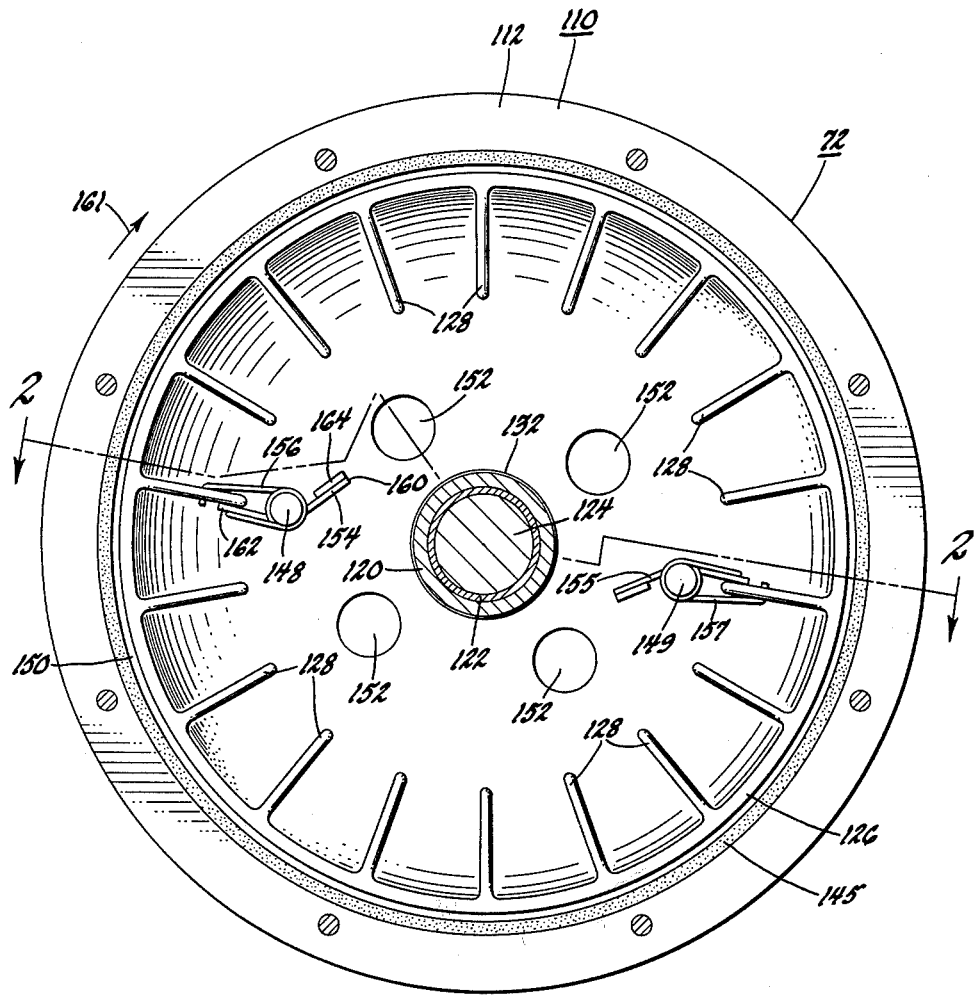
FIGURE 3 is a sectional view, partly in elevation, taken along line 3—3 in FIGURE 2.

In accordance with this invention and with reference to FIGURE 2, vanes 154, 155 are pivotally mounted on bottom shouldered pins 148, 149 which are fastened as at 151, 153 to the impeller. Springs 156, 157 serve to bias their respective vanes into the extended position seen in FIGURE 2. This serves to extend generally radially inwardly two of the diametrically opposite vanes 128. When the motor 62 is operating in low speed, the vanes 154, 155 remain extended as seen in FIGURE 2. However, when the motor 62 is operating in high speed and the fluid coupling is rotating in the direction of the arrow 161, the vanes fold back about 90° as seen in FIGURES 4 and 5 to reduce the torque requirements of the fluid coupling on the motor. Note that each vane, 154 for instance, consists of a weighted leading end 160 and a trailing end 162. This flipper vane is pivotally mounted, counterweighted by the weight 164, and spring loaded by the spring 156 in such a way that it extends the length of the impeller blade 128 at the lower spin speed (FIGURES 2 and 3) but swings out of this position approximately 90° where its effect on the fluid is minimized at the high-spin speed (FIGURES 4 and 5). The overcenter snap action results from the increasing lever arm of the weight as the vane swings. This geometry also counteracts the increasing spring load. The hydrodynamic load along the vane length must be balanced. Therefore, the location of the pivot intermediate the ends of the vane and the offset angle of the weighted end 160 and the trailing end 162 of the flipper vane all combine to accomplish this result.

A second embodiment is seen in FIGURE 6 and differs from that described hereinabove in that a pin 170 is cast integrally with the impeller 172 rather than being attached separately as in the previous version. Aside from this, the construction and the operation are identical to that described hereinbefore. It is also within the purview of this invention to use a roll pin pressed into the impeller casting.

Turning now to the FIGURE 7, the operation of the improved fluid coupling is shown in the solid line curve 174 while the motor curves are seen in dashed line at 182 for high speed and at 183 for low speed. The torque requirement of the coupling from the motor at low speed is represented at the point 180 whereas the torque requirement with the motor in high speed is seen as point 186. Note that the torque requirement of approximately 21 ounce-feet at high speed is only slightly higher than the torque requirement 16.6 ounce-feet at low speed. This results from the fact that the vanes 154 and 155 fold over to the position of FIGURES 4 and 5 at the point 176 on the curve 174. This immediately reduces the torque requirements of the coupling which then continues its acceleration along the curve portion 184. The speed at which the vane shift or fold-over occurs should be consistently between the maximum motor switching speed and below the speed at which the coupling torque requirements would exceed the high-speed motor running torque. In the example of FIGURE 7 the operation of the vanes 154, 155 should be controlled or designed to pivot between 1250–1400 r.p.m.

The advantages of this invention become apparent if we follow the curve 178 for a 255 cc. oil charged prior art coupling. When the motor reached its high-speed operation, approximately 35 ounce-feet of torque would be required to drive the fluid coupling, rather than the 21 ounce-feet required with the use of this invention. In other words, the solid curve 174 represents an improved fluid coupling which operates like a similarly sized coupling having a large charge of oil at low speed (curve 178) and having a small charge of oil at high speed (curve 179).

It should now be seen that an improved fluid coupling has been provided wherein a single device is satisfactory to reduce torque requirements on a motor during high-speed operation.

While the embodiments of the present invention as herein disclosed constitute preferred forms, it is to be understood that other forms might be adopted.

What is claimed is as follows:

In combination with a motor operable at high and low predetermined speeds, a fluid coupling including means forming a housing mounted for rotation about a substantially vertical axis and adapted to contain a fluid in a lower portion thereof, said lower portion of said housing having driven blade means, impeller means in an upper portion of said housing drivably connected to said motor and including substantially radial drive blade means rotatable relative to said driven blade means about said substantially vertical axis, said impeller means having means extending into said lower portion to initiate movement of said fluid into said upper portion to establish a fluid connection between said housing and said impeller means when said impeller means is rotating, and means on said impeller means above the fluid in said lower portion when said impeller means is not rotating and snap-actingly responsive to a speed of said motor between said high and low predetermined speeds for altering said fluid connection in a manner to reduce substantially instantaneously the power requirements of said fluid coupling on said motor, said snap actingly responsive means including a vertically pivoted vane having a trailing end engageable with said drive blade means as a substantially radial extension thereof and a weighted leading end angled from said trailing end in the direction of impeller means rotation when said trailing end is in engagement with said drive blade means and means for yieldably pivotally biasing said vane about its pivot to a position wherein said trailing edge is in substantial engagement with said drive blade means when said motor is operatng in said low predetermined speed, said vane snap-actingly pivoting to a position substantially perpendicular to said drive blade means in response to the action of centrifugal force on said weighted leading end thereof when said motor is operating in said high predetermined speed.

References Cited in the file of this patent

UNITED STATES PATENTS

| | | |
|---|---|---|
| 2,117,673 | Lysholm | May 17, 1938 |
| 2,235,672 | Dodge | Mar. 18, 1941 |
| 2,377,009 | Heyer | May 29, 1945 |
| 2,623,359 | Castner | Dec. 30, 1952 |
| 2,711,076 | Sharp | June 21, 1955 |
| 2,758,443 | McKee | Aug. 14, 1956 |
| 2,805,549 | Hensleigh et al. | Sept. 10, 1957 |